United States Patent
Jones et al.

(10) Patent No.: US 6,513,068 B1
(45) Date of Patent: *Jan. 28, 2003

(54) APPARATUS AND METHOD FOR MONITORING AND CONTROLLING REMOTE INTERACTIVE SYSTEMS

(75) Inventors: Timothy L. Jones, Austin, TX (US); Jeffrey D. Travis, Austin, TX (US)

(73) Assignee: Nacimiento Software Corporation, Austin, TX (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/282,232

(22) Filed: Mar. 31, 1999

(51) Int. Cl.[7] ................................................. C06F 15/38
(52) U.S. Cl. ........................................ 709/236; 709/231
(58) Field of Search ............................. 434/276; 463/1; 709/203, 205, 227, 230, 238, 236, 231

(56) References Cited

U.S. PATENT DOCUMENTS

| | | | | |
|---|---|---|---|---|
| 5,706,437 A | * | 1/1998 | Kirchner et al. | 709/203 |
| 5,757,669 A | * | 5/1998 | Christie et al. | 709/205 |
| 5,964,660 A | * | 10/1999 | James et al. | 463/1 |
| 6,085,224 A | * | 7/2000 | Wagner | 709/203 |
| 6,112,246 A | * | 8/2000 | Horbal et al. | 709/230 |
| 6,115,744 A | * | 9/2000 | Robins et al. | 709/227 |
| 6,240,462 B1 | * | 5/2001 | Agraharam et al. | 709/238 |
| 6,261,103 B1 | * | 7/2001 | Stephens et al. | 434/276 |

OTHER PUBLICATIONS

"LabVIEW for Everyone: Graphical Programming Made Even Easier" K. Wells et al, Prentice Hall, 1997.*

* cited by examiner

*Primary Examiner*—Christine Oda
*Assistant Examiner*—Walter Benson
(74) *Attorney, Agent, or Firm*—J. Nevin Shaffer, Jr.; Shafer & Culbertson, LLP

(57) ABSTRACT

An apparatus and method for monitoring and controlling remote interactive systems includes a client, a client computer, and a client server for a computer network. A bidirectional data stream of information about a remote interactive instrument/game is provided on the server. A communication socket, creating a connection-oriented communication path between the client computer and the server is provided for enabling transfer of the bidirectional data stream between the client computer and the server. A detachable header is provided on the server which describes and identifies the data stream, separate and apart from the bidirectional data stream, and provides access to the bidirectional data stream by the client.

20 Claims, 4 Drawing Sheets

APPARATUS AND METHOD FOR MONITORING AND CONTROLLING REMOTE INTERACTIVE SYSTEMS

BACKGROUND OF THE INVENTION

This invention relates to an apparatus and method for monitoring and controlling remote interactive systems and in particular for monitoring and controlling remote virtual instrumentation systems over a computer network.

For the purposes of this invention, a "virtual instrumentation" system is a physical instrument for which controls in a computer window are used to manipulate an instrument, rather than the controls on the actual instrument itself. The use of computers to operate and control machines in place of manual controls is steadily increasing. The reasons for the increase are many and include, for example, the desire for physical safety of the user and physical security of the machine.

Similarly, computer gaming by remote player/game raises the need for the remote manipulation of the game. Concurrently, the use of the internet and intranet(s) to obtain and distribute information is also increasing. The internet and intranet(s) provide(s) access to data to remote clients around the world.

A drawback to the virtual instrumentation systems and computer games of the prior art is that they are not fully accessible, controllable, and monitorable via remote clients through the internet and intranets. Thus, there is a need in the art for providing an apparatus and method for remote monitoring and controlling of interactive systems over computer networks. It, therefore, is an object of this invention to provide an apparatus and method for remote monitoring and controlling of interactive systems over computer networks including inter and intra-nets.

SHORT STATEMENT OF THE INVENTION

Accordingly, the apparatus for remote monitoring and controlling of interactive systems over a computer network includes a client, a client computer and a server. A bidirectional data stream is located on the server containing representative data relevant to a remote interactive system. A communication socket, creating a connection-oriented communication path between separate software processes, connects a client computer and a server for providing the transfer of the data stream between the client computer and the server. A detachable header is provided on the server that describes and identifies the data stream, separate and apart from the data stream, and provides access to the data stream by the client computer. The detachable header describes and brings meaning to the data stream flowing over the communication socket. In a preferred embodiment, the data stream includes an overall stream and individual substreams. By means of the detachable header, the description of the data stream and substreams is separated from the data stream itself thereby providing a unique and powerful mechanism for controlling and monitoring remote objects. A corresponding method for monitoring and controlling remote interactive systems is also provided and described and disclosed more fully hereafter.

BRIEF DESCRIPTION OF THE DRAWINGS

Other objects, features and advantages of the present invention will become more fully apparent from the following detailed description of the preferred embodiment, the appended claims and the accompanying drawings in which:

FIG. 2 illustrates the use of the detachable header of the present invention in four separate situations:

DETAILED DESCRIPTION OF THE PREFERRED EMBODIMENT

Figure 1:
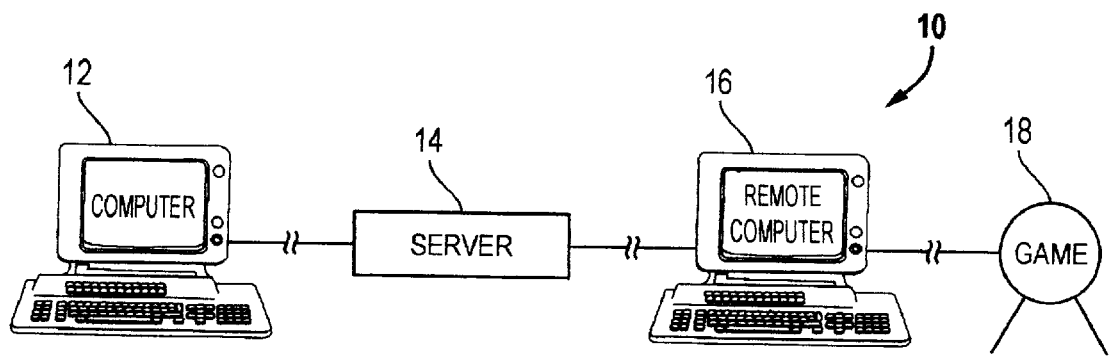
FIG. 1 is a schematic diagram of a preferred embodiment of the apparatus of the present invention.

The preferred embodiment of the present invention is illustrated by way of example in FIGS. 1–5. With specific reference to FIGS. 1 and 2, an apparatus for monitoring and controlling remote interactive systems 10 includes a client's computer 12, server 14, remote computer 16 and instrument interactive/game 18.

In a preferred embodiment, instrument 18 is any instrument known in the art or hereafter created which is capable of remote control and monitoring by remote computer 16. Likewise, remote computer 16, is any computer processor means now known or hereafter developed capable of controlling and monitoring instrument 18 without need of a human being actually, physically, controlling the manual controls of instrument 18. Server 14 is any server, now known or hereafter developed, to which client computer 12 and remote computer 16 may be electronically connected. Client computer 12 is any computer now known or hereafter developed that enables a client to communicate, electronically or otherwise, with server 14 within a computer network. For the purposes of this invention, a computer network may be, in a preferred embodiment, an intranet or, in another preferred embodiment, the internet.

Together, remote computer 16 and interactive instrument/ game 18 comprise a "virtual instrumentation" system whereby physical instrument/game 18 is manipulated through controls in the computer window of remote computer 16 rather than through manual controls on the actual instrument/game 18. The interaction between remote computer 16 and interactive instrument/game 18 creates a bidirectional "data stream". The data stream may consist of many individual substreams, which are streams of data associated with individual objects communicating through the same overall data stream.

Referring now to FIG. 2, data stream 20 and detachable header 22 are illustrated. Again, data stream 20 may consist of many individual substreams, which are streams of data associated with individual objects communicating through the same overall data stream. Detachable header 22 describes and brings identity to the data stream 20, and to the individual substreams, flowing over a communication socket. For the purposes of this invention, a "communication socket" is defined to be a connection-oriented communication path between software processes. For example, in the environment of the internet, this would be a TCP/IP socket, such as an HTTP socket between a web browser and a web server. In other environments, the communication socket may be any communication mechanism which allows software objects to communicate a bidirectional stream of data intact between each other.

Additional characteristics of detachable header 22 are that it usually contains "static" information which describes the individual substreams. The detachable header 22 may also contain a description of the data stream 20, visual representation information of substreams/objects; min, max, color, etc., information for each object; expected data types for each objects's property; information relating substreams/objects together; security information such as ID, encryption, etc.; information about where to retrieve the data stream 20; permission hierarchy information of a client versus other client users; and naming information about the substreams/objects.

As far as the data stream 20 is concerned, for the purposes of this invention it usually contains "dynamic" data which flows according to time. It may contain zero or more individual substreams associated with individual objects. It may also contain time stamps associated with data; substream data sources (i.e. IP addresses or names); and commands to dynamically create and delete substreams.

Because detachable header 22 separates the description of the data stream 20, and substreams, from the data itself, in the form of special information contained in the detachable header 22 as previously described and as will be more particularly described hereafter, Applicant's invention provides a uniquely powerful mechanism for controlling and monitoring remote interactive instruments/games 18.

FIG. 2 illustrates four possible scenarios for use of detachable header 22. Referring now to FIG. 2A, case one illustrates the situation where a single communication socket is used and detachable header 22 precedes the data on the data stream 22. In this case, a client establishes a communication socket with server 14. Server 14 sends the detachable header 22 over the communication socket and then starts streaming data over the same socket.

Figure 2A:
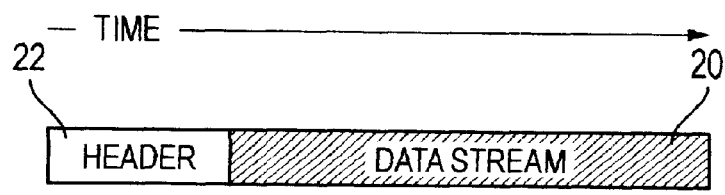
FIG. 2A illustrates a single data stream and the detachable header preceding the data on the data stream.
Figure 2B:
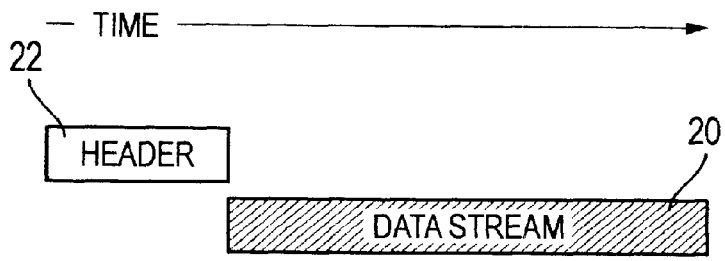
FIG. 2B illustrates two or more data streams where the detachable header is retrieved from one place and information in the detachable header is used to open the data stream.

Referring now to FIG. 2B, case two is illustrated. In case two, two (or more) communication sockets are used and the detachable header 22 is retrieved from one place, and information in the detachable header is used to open the data stream 20. This is the most common case and preferred embodiment of the invention. That is, in this case, a client retrieves a detachable header 22 from a server 14 and uses the information in the detachable header 22 to establish a communication socket with server 14 (or another server 14). Server 14 then begins streaming data immediately and the client is enabled to interpret it according to the detachable header 22 the client has received.

Figure 2C:
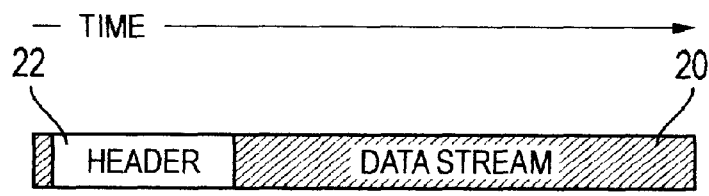
FIG. 2C illustrates the case where a data stream is open and a query is issued to retrieve the detachable, header

Referring now to FIG. 2C, the situation is illustrated where the data stream 20 is open and then a query is issued to retrieve detachable header 22. That is in this case a client establishes a communication socket with server 14 and the server immediately begins streaming data stream 20. The client then asks the server 14 for detachable header 22 and ignores any streamed data 20 until it receives detachable header 22. Once detachable header 22 has been retrieved, the client begins interpreting the stream data 20.

Figure 2D:
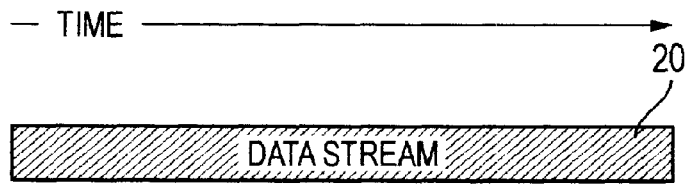
FIG. 2D illustrates the situation where there is no data in the data stream and no detachable header is provided.

FIG. 2D illustrates case four wherein only a raw protocol is used without any header. This case applies only if the initial data stream 20 has no data in it. That is, case four illustrates the situation where a client establishes a communication socket with server 14. Server 14 sends out commands to dynamically create new data substreams, which the client can interpret. Any data substreams not dynamically created are ignored by the client.

In the preferred embodiment, detachable header 22 has some basic information to start with and then an archived property change event stream. The basic information, in a preferred embodiment, includes: (1) a data server identifier; (2) a version number; (3) an applet ID; (4) the size of the initial substream list; and (5) the list of initial substreams types. Detachable header 22 information is generally considered "static" information. It could be, however, dynamically generated. As a static file, the detachable header 22, however, can be retrieved from a web server as a custom multimedia internet mail extension ("MIME") type. The detachable header can contain information about the overall stream, such as security information, where to retrieve the data stream, encryption keys for opening the data stream, etc. In the preferred embodiment, the overall data stream is considered to be an object with properties, like the substreams, and the information about the overall stream is stored in the archived property change event stream.

The detachable header 22 is not assumed to identify every substream in the data stream 20. For the purposes of a preferred embodiment of the invention, only the substreams which are desired to be identified are identified by detachable header 22, so that different clients can receive and control different objects over the same data stream 20. In this way, permission hierarchies may be implemented.

By way of further explanation, data stream 20 in a preferred embodiment consists of three packet types: message, action and property change.

The purpose of a message packet is to convey an error code or some other kind of status information between client computer 12 and server 14. The message packet consists of a message type identifier and the value(s) associated with the message.

The purpose of an action packet is to create or delete a data substream in the overall data stream 20. It consists of an action type identifier and the value(s) associated with the action (usually a substream identifier). A creation packet can create a type of substream not generally known by the remote computer 16. In such a case, the packet will contain information to allow the programs which implement the substream to be dynamically loaded.

The purpose of a property change packet is to change a property associated with a data substream. Data substreams are modeled as objects which have arbitrary properties associated with them. The data substream type determines the type of object a substream represents, and therefore, which properties a substream will have. A property change packet allows any property to be changed or queried. The overall data stream 20 is to be considered to be an object as well, and has associated properties.

A sequence of data values for an object is considered, in accordance with this invention, to be a property as well. The data can either be appended or replaced depending on the type of object. For example, the data associated with a streaming chart always appends to the previous data; the data associated with a switch ("on/off") always replaces the previous data.

Importantly, the data stream is bidirectional. That is, either the client computer 12 or the server 14 can send any kind of packet. Likewise, either end is able to modify a property of any object. In a client computer 12/server 14 environment, the server 14 is considered to have the final say over an object's value. The bidirectional model allows both control and monitoring of remote interactive systems, such as virtual instrumentation systems and gaming systems. A unidirectional model is also enabled whereby a remote interactive system may be monitored, as by students, but not controlled, for example.

In accordance with the terms of this invention, data stream 20 can be fetched from a file. This mechanism allows data stream 20 to be live or archived.

Further, the type of object represented by a substream determines its expected visual appearance on client computer 12. That is, a knob, slider, graph, etc. Since the data stream 20 has a defined protocol, it can be registered with Internet authorities to make it a known web protocol using standard web browser protocol URLs.

Still further, at the level of this invention data stream 20 does not have a time out. No assumptions are made about the frequency or volume of data in the data stream 20.

Figure 3:
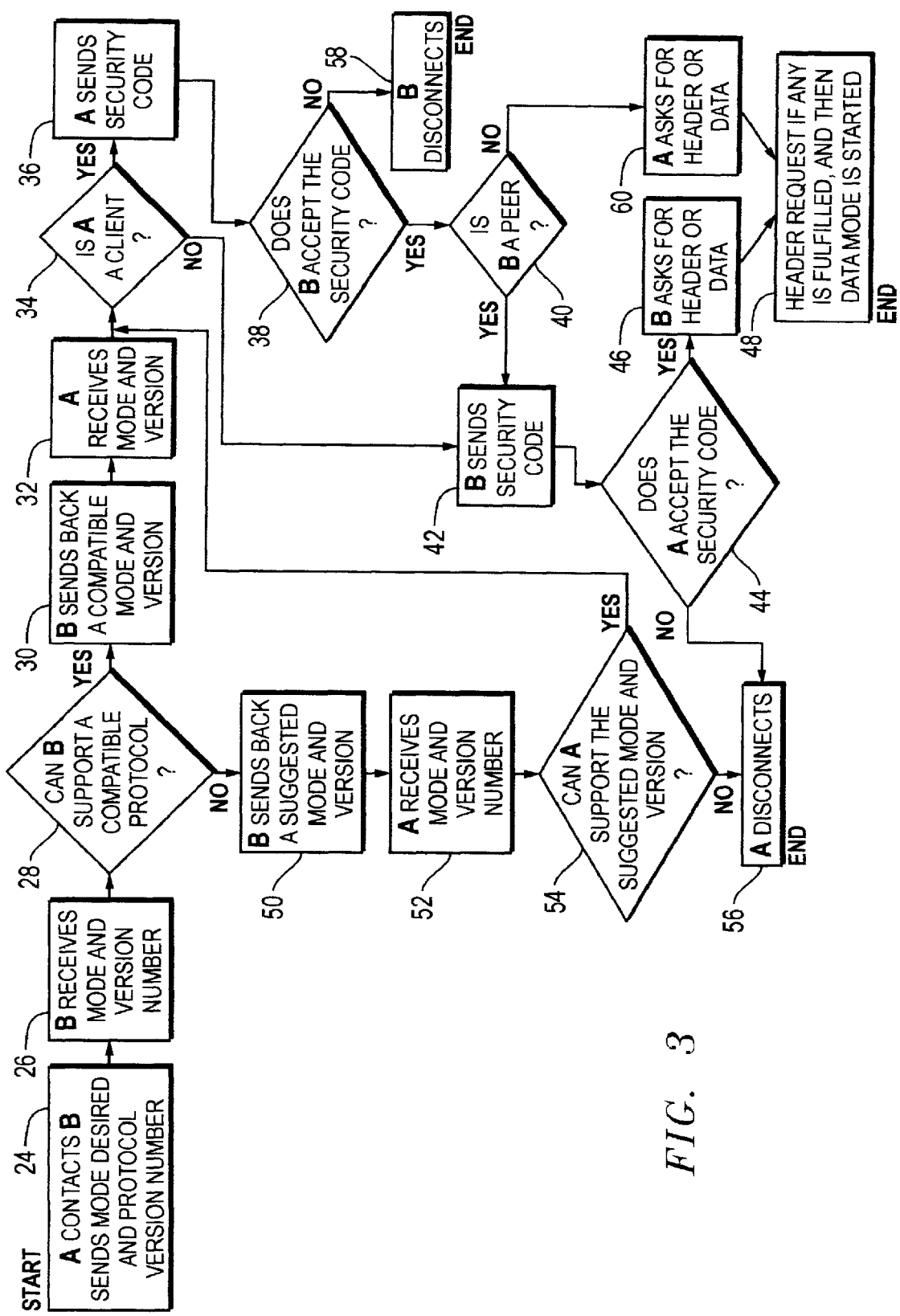
FIG. 3 is a flow diagram illustrating the establishment of a communication socket of the present invention.

Referring now to FIG. 3, the establishment of a communication socket is illustrated by way of a flow chart. For the purposes of this invention, a communication socket is any connection-oriented communication path between software processes, whether the software processes are the same process, on the same machine, or on different machines connected through a computer network. As illustrated, the establishment of a communication socket begins at block 24 wherein A, such as client computer 12, contacts B, such as server 14, and sends the mode desired and protocol version number to B. In block 26, B receives the mode and version number. In block 28, B determines if it can support a compatible protocol. If yes, in block 30, B sends back a compatible modem version. A receives the mode and version in block 32. If A is a client, in block 34, A sends a security code, block 36, to B. In block 38, B determines if it accepts the security code and queries, in block 40, if B is a peer. If yes, B sends the security code to A, block 42. if A accepts the security code, block 44, B asks for detachable header 22 or data stream 20 in block 46 and in block 48, the detachable header request, if any, is fulfilled and then the data mode is started.

In block 28, if B cannot support a compatible protocol, B sends back a suggestion mode and version, block 50, A receives the mode and version, block 52, and queries if A can support this suggested mode and version in block 54. If not, A disconnects at block 56. If yes, the system proceeds to block 34. At block 38, if B does not accept the security code, B disconnects at block 58.

At block 40 if B is not a peer, A asks for detachable header 22 or data stream 20 in block 60.

Figure 4:
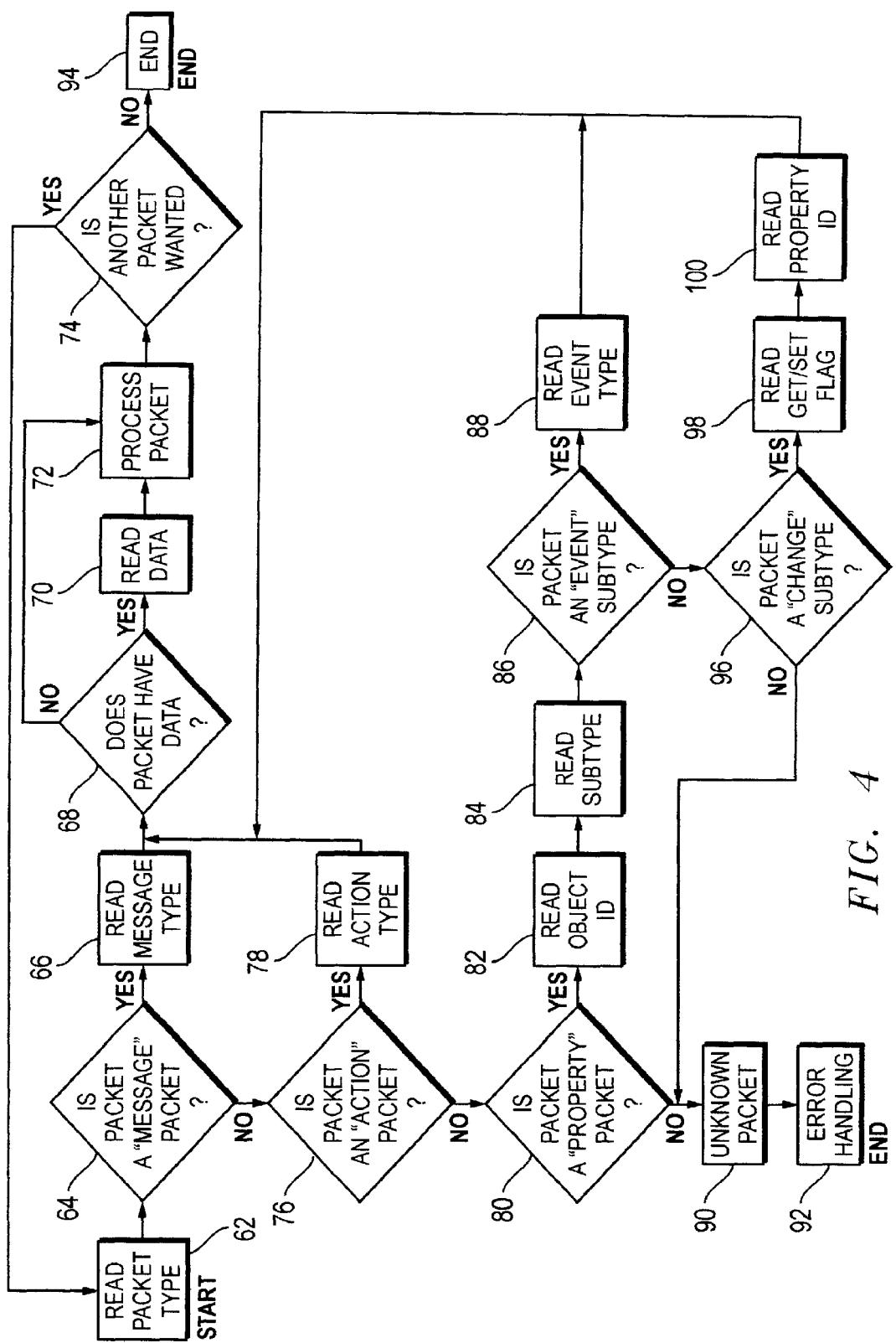
FIG. 4 is a flow diagram illustrating the transfer of packet information through the data stream of the preset invention.

Referring now to FIG. 4, an illustration of the processing of a packet of information in accordance with the invention, on the data stream 20 is provided by way of a flow diagram. In accordance with the present invention, the processing of information packets is accomplished in accordance with the following system. Beginning at block 62, a packet is analyzed. In block 64, the query "Is the packet a 'message' packet?" is made. If yes, the message type is read, in block 66 and block 68 queries "Does the packet have data?". If yes, the data is read in block 70, processed in block 72 and the query is then asked in block 74, "Is another packet wanted?". If yes, the system returns to block 62. In block 64, if the answer is no, block 76 queries "If the packet is an 'action' packet?". If yes, the action type is read in block 78 and the processes proceeds to block 68. In block 76 if the answer is no, the query is asked in block 80 "Is the packet a 'property' packet?". If yes, the object ID is read in block 82, the subtype is read in block 84 and the query is asked in block 86, "Is the packet an 'event' subtype?". If yes, the event subtype is read in block 88 and the process proceeds to block 68. If the answer is no in block 80 the packet is identified in block 90 as an unknown packet and passed to block 92 for error handling and termination.

If the answer is no in block 68, the process skips to blocks 72.

If the answer in block 74 is no, the processsn is terminated in block 94.

If the answer in block 86 is no, the query is asked in block 96, "Is the packet a 'change' subtype?". If yes, the read get/set flag is set in block 98 and the read property ID is accomplished in block 100 and then proceeds to block 68.

If the answer in block 96 is no, the process proceeds to block 90.

Figure 5:
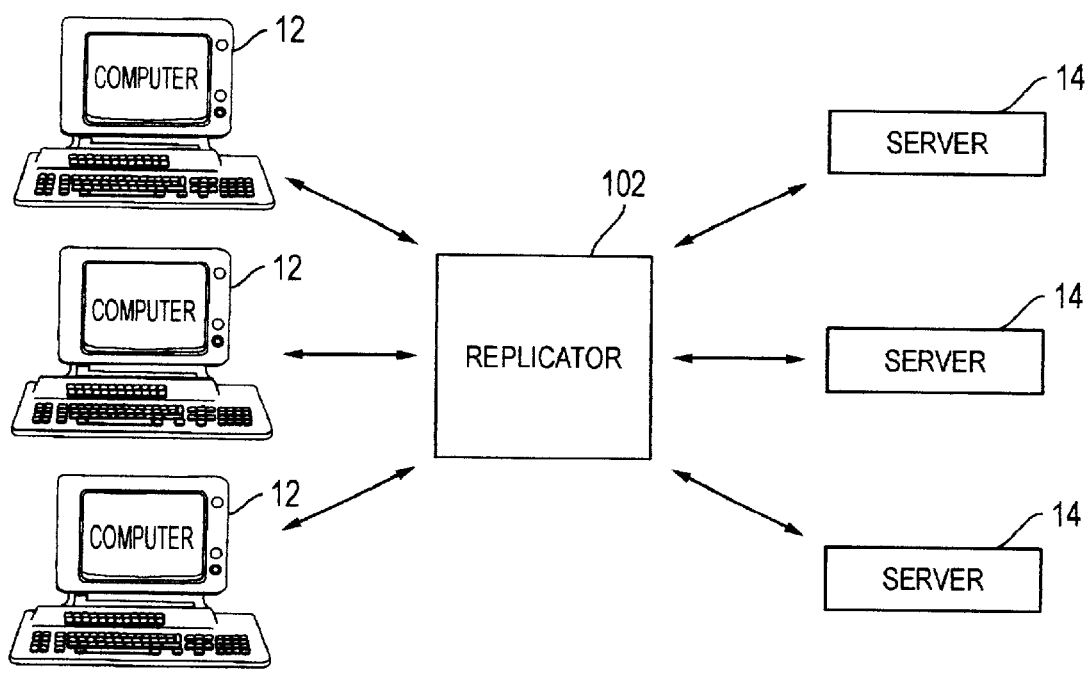
FIG. 5 is an illustration of the use of a replicator for allowing multiple clients to interact with multiple servers of the present invention.

Referring now to FIG. 5, a preferred embodiment of the present invention is illustrated. In this preferred embodiment, a replicator 102 is provided between client computer(s) 12 and server(s) 14 whereby multiple clients can interact with multiple servers 14. Certainly replication can be done by any means known in the art, and on a separate machines as the data source, or on the same machine.

By way of further explanation, some examples of message types are as follows: no such component; send all default values; cannot respond to request; pause sending data; start sending data; and send component count.

Examples of action types are: create object; and destroy object.

Examples of object types are: knob; slider; button; switch; checkbox; LED; textbox; chart; image; and label.

Examples of object properties are: default property; size; location; bounds; background; foreground; enabled; visible; cursor; font; name; label; newPoint; plotMinplotX; plotMaxX; plotMinY; plotMaxwise; gridWidthX; gridWidthY; gridDivisionsX; gridDivisionsY; increment; pointColor; axisColor; connected; drawPoints; autoScale; newPoints; colorScheme; and accessMargin.

Examples of object events are: button press; mouse enter; mouse leave; and key press.

By way of a useful application of Applicant's invention the following is provided. National Instruments of Austin, Tex. currently offers a software program called LabView. The most current version of the LabView software is LabView version 5.0. In general, LabView software is a virtual instrumentation software used for a wide variety of research and industrial applications, such as automated testing, laboratory automation, advanced research, industrial control, factory automation, physiological monitoring, numerical analysis, and data visualization. Such software would be on remote computer 16, for example, monitoring and controlling instrument 18. In this embodiment, detachable header 22 is created in the form of a jvi file or static archive. The replicator is started on server 14, and connects to remote computer 16 once remote computer 16 is connected to server 14, data stream 20 is received at server 14. Detachable header 22 is retrieved from server 14 and is utilized to identify and connect with the remote computer 16 through a communication socket to the replicator on server 14 thereby enabling the client to both monitor and control the remote interactive system.

While the present invention has been disclosed in connection with the preferred embodiment thereof, it should be understood that there may be other embodiments which fall within the spirit and scope of the invention as defined by the following claims.

What is claimed is:

1. An apparatus for monitoring and controlling remote virtual instrumentation systems comprising:
   a) a client, a client computer and a server for a computer network;
   b) multiple sessions of unique messages in the form of a bidirectional data stream of information relative to a remote interactive system on said server;
   c) a communication socket means, creating a connection-oriented communication path between said client computer and said server for enabling bidirectional transfer of said data stream between said client computer and said server, and
   d) a detachable header on said server, describing and identifying said data stream, separate and apart from said data stream, for providing access to said data stream by said client, connectable to said bidirectional data stream per multiple session and not to each unique message.

2. The apparatus of claim 1 wherein said detachable header is on said client computer.

3. The apparatus of claim 1 wherein said detachable header further comprises:
   a) detachable header identifying information; and
   b) an archived property change event stream.

4. The apparatus of claim 3 wherein said detachable header information further comprises:
   a) a data server identifier;
   b) a version number;
   c) an applet ID;
   d) a static substream list size; and
   e) a static substream list of types.

5. The apparatus of claim 3 wherein said detachable header further comprises a static file.

6. The apparatus of claim 3 wherein said detachable header further comprises security information about said data stream.

7. The apparatus of claim 1 wherein said data stream further comprises data substreams.

8. The apparatus of claim 7 wherein said detachable header further comprises information identifying some of said data substreams.

9. The apparatus of claim 7 wherein said data stream further comprises:
   a) a message packet including a message type identifier and values associated with a message;
   b) an action packet including an action type identifier and values associated with an action; and
   c) a property change packet for changing a property associated with said data substreams.

10. The apparatus of claim 9 wherein said data stream is unidirectional.

11. The apparatus of claim 7 wherein said data substreams further comprise object, type and property information.

12. The apparatus of claim 7 wherein said detachable header further comprises visual representation information about said data substreams.

13. The apparatus of claim 7 wherein said detachable header further comprises naming information about said data substreams.

14. The apparatus of claim 7 wherein said data stream is fetched from a file.

15. The apparatus of claim 1 further comprising a replicator means connected to said server for providing access to said server by more than one client computer.

16. A method for monitoring and controlling remote interactive systems comprising the steps of:
   a) connecting a computer means for monitoring and controlling interactive objects to and interactive object;
   b) connecting said computer means to a server for a computer network so that multiple sessions of unique messages in the form of a bidirectional data stream with said interactive objects are on said server;
   c) connecting a client computer to said server with a communication socket means, creating a connection-oriented communication path between separate software processes, for transferring said bidirectional data stream between said server and said client computer;
   d) creating a detachable header describing and identifying said bidirectional data stream, separate and apart from said bidirectional data stream, on said server, for use by a client in accessing said bidirectional data stream and connecting said detachable header to said bidirectional data stream per multiple session and not per each unique message; and
   e) said client using said client computer and accessing said bidirectional data stream, through said communications socket, on said server by means of said detachable header connected to said bidirectional data stream per multiple session and not per each unique message and monitoring and controlling said interactive objects.

17. The method of claim 16 further comprising the step of connecting a replicator means to said server for providing access to said server by more than one client.

18. The method of claim 16 wherein the step of creating a detachable header further comprises the steps of:
   a) including a data server identifier;
   b) a version number;
   c) an applet ID;
   d) a static substream list size; and
   e) a static substream list of types.

19. The method of claim 16 wherein the step of creating a detachable header further comprises the step of providing security information about said bidirectional data stream in said detachable header.

20. The method of claim 16 wherein said bidirectional data stream further comprises data substreams and the step of creating a detachable header further comprises the step of providing information identifying some of said data substreams.

* * * * *